(12) United States Patent
Lim et al.

(10) Patent No.: US 7,708,327 B2
(45) Date of Patent: May 4, 2010

(54) VEHICLE CARGO FLOOR ORGANIZER

(75) Inventors: Stephen T. Lim, Farmington Hills, MI (US); Brett Ladetto, Clarkston, MI (US); Aaron Schnepp, Shelby Township, MI (US); Louis A. Rhodes, Farmington Hills, MI (US); Paresh Rana, Clawson, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 385 days.

(21) Appl. No.: 11/747,944

(22) Filed: May 14, 2007

(65) Prior Publication Data
US 2008/0284192 A1    Nov. 20, 2008

(51) Int. Cl.
*B60R 5/04*    (2006.01)
(52) U.S. Cl. ............... 296/37.1; 296/37.16; 296/37.14; 410/97
(58) Field of Classification Search ............... 296/37.1, 296/37.2, 37.3, 37.5, 37.6, 37.16, 37.14, 296/37.8; 410/97, 100, 118
See application file for complete search history.

(56) References Cited

U.S. PATENT DOCUMENTS

| 5,772,370 | A | 6/1998 | Moore |
| 6,439,633 | B2 | 8/2002 | Nemoto |
| 6,921,119 | B2 * | 7/2005 | Haspel et al. ............... 296/24.4 |
| 7,017,980 | B1 * | 3/2006 | Bejin et al. ............ 296/193.07 |
| 2002/0070574 | A1 * | 6/2002 | Carlsson et al. .......... 296/37.14 |
| 2006/0022479 | A1 * | 2/2006 | Mulvihill et al. ......... 296/37.16 |

* cited by examiner

*Primary Examiner*—Joseph D Pape
(74) *Attorney, Agent, or Firm*—Ralph E. Smith

(57) ABSTRACT

The technology described herein provides a slidable, retractable, and foldable cargo floor organizer with a rotatable and extensible retention net frame and associated cargo retention net for the rear cargo floor area of a vehicle. The system additionally provides an interior cargo tray having multiple partitions. The system includes a cargo retention net frame disposed about the interior cargo tray, wherein the cargo retention net frame is extensible, and a cargo retention net, the cargo retention net being disposed about the retention net frame, and wherein the cargo retention net is extensible and extends as the cargo retention net frame extends. The system provides for the secure containment of cargo in the rear cargo floor area of a vehicle.

20 Claims, 14 Drawing Sheets

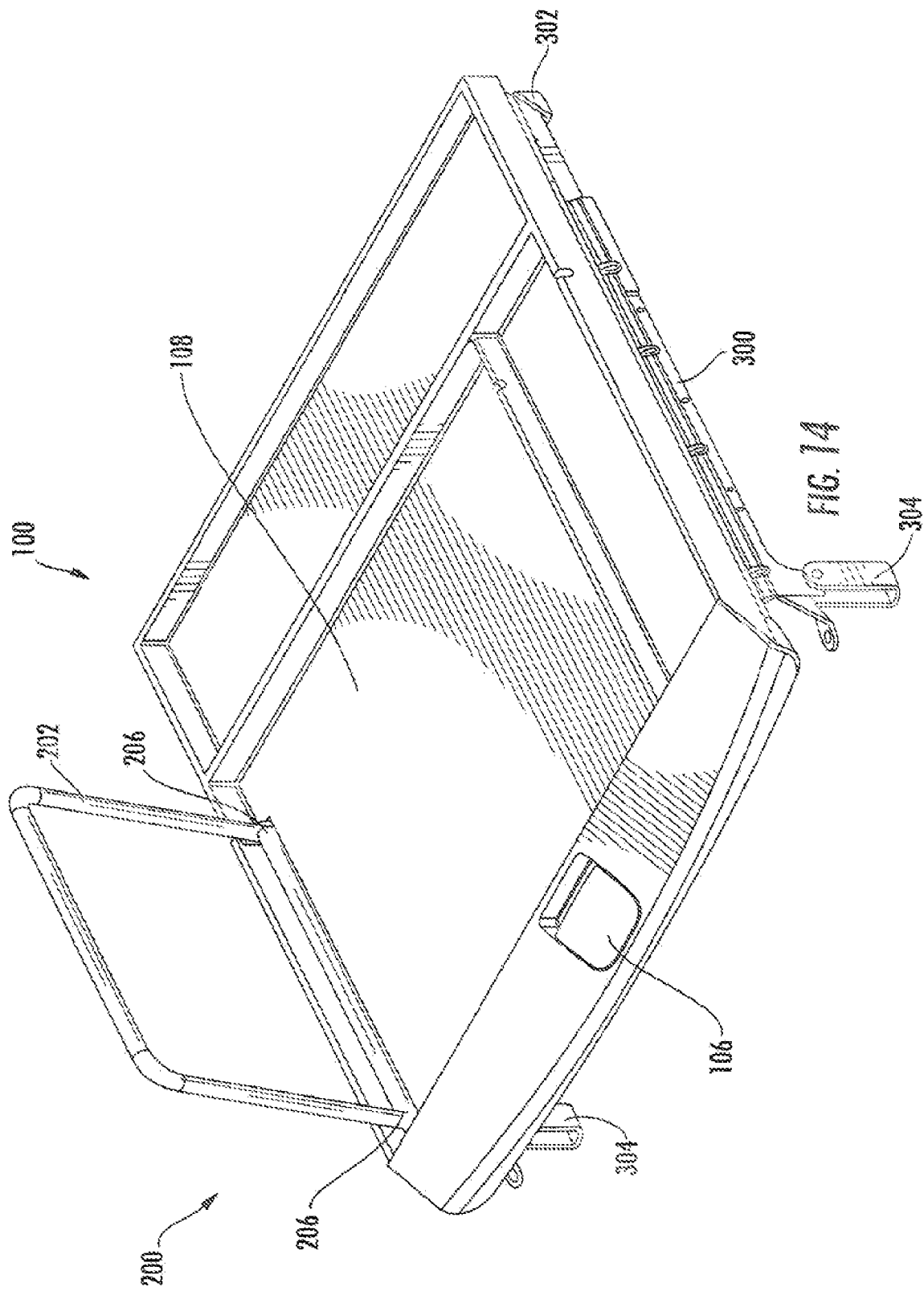

VEHICLE CARGO FLOOR ORGANIZER

FIELD OF THE INVENTION

The technology described herein relates generally to systems for cargo organization in vehicles. More specifically, the technology described herein relates to a slidable, retractable, and foldable cargo floor organizer and multiple-compartment interior cargo tray area with a rotatable and extensible retention net frame and associated cargo retention net for the rear cargo floor area of a vehicle. The system provides for the secure containment of cargo in the rear cargo floor area of a vehicle.

BACKGROUND OF THE INVENTION

The vehicle cargo systems now in general use for the rear floor cargo area are used to prevent cargo items from moving around freely or sustaining damage during transit. A variety of rear floor cargo organization and retaining systems and methods have been described previously and are known in the related art. None of these systems or methods, however, is designed to solve the particular problem addressed by the technology described herein, and none is capable of being modified to do so. For example, U.S. Pat. No. 5,772,370, issued to Moore on Jun. 30, 1998, discloses a net-type cargo restraining system for motor vehicles of the type having a cargo floor with a front area, and a hinged exterior door which opens from outside the vehicle to provide access to the cargo floor. Also, for example, U.S. Pat. No. 6,439,633, issued to Nemoto on Aug. 27, 2002, discloses a luggage holding apparatus for a vehicle used in coordination with removable floor panels covering the rear cargo area of the vehicle. Neither Moore nor Nemoto disclose a system for a slidable, retractable, and foldable cargo floor organizer with a rotatable and extensible retention net frame and associated cargo retention net for the rear cargo floor area of a vehicle. Additionally, neither Moore nor Nemoto disclose a system providing multiple storage compartments. Therefore, a need still exists for such a system as the one described herein.

BRIEF SUMMARY OF THE INVENTION

In various exemplary embodiments, the technology described herein provides a slidable, retractable, and foldable cargo floor organizer and multiple-compartment interior cargo tray area with a rotatable and extensible retention net frame and associated cargo retention net for the rear cargo floor area of a vehicle. The system provides for the secure containment of cargo in the rear cargo floor area of a vehicle.

In one exemplary embodiment, the technology described herein provides a cargo organization and retention net system for securely holding cargo in place, in combination with a vehicle having a rear cargo area. The cargo organization and retention net system includes an interior cargo tray having a plurality of partitions and compartments and a cargo retention net frame attachably disposed to the interior cargo tray area. The interior cargo tray area having multiple partitions includes a plastic washable surface area. The cargo retention net frame is extensible and pivotable from the interior cargo tray. The cargo organization and retention net system also includes a cargo retention net, the cargo retention net being disposed about the retention net frame. The cargo retention net also is extensible from the cargo retention net frame and extends as the cargo retention net frame extends. The cargo organization and retention net system also includes a rear cargo area top lid, wherein the rear cargo area top lid is hingedly attached to the cargo organization and retention net system, and the rear cargo area is retractable. The cargo organization and retention net system includes a separator flap, wherein the separator flap is hingedly attached to the cargo organization and retention net system and is both retractable and foldable. When the rear cargo area top lid and the separator flap are both retracted, the interior cargo tray area having multiple partitions is accessible. The cargo organization and retention net system also includes a plurality of retention net frame pivot points, which are hingedly attached to the interior cargo tray, and about which the retention net frame pivots and is raised or lowered, as desired, to hold a cargo item securely in place.

In another exemplary embodiment, the cargo organization and retention net system also includes a ratchet tension locking mechanism integrally located within the retention net frame pivot points. The cargo retention net frame and the cargo retention net are held in place while pivoted, and while in a closed position, by the ratchet tension locking mechanism integrally located within the retention net frame pivot points.

In another exemplary embodiment, the cargo organization and retention net system includes a release latch, whereby the cargo organization system is grasped by a user and either is lifted upward or pulled outward. When the cargo organization system is lifted upward, a rear cargo storage area beneath the floor level is made available. When the cargo organization system is pulled outward, the interior cargo tray area is made more accessible to a user.

In yet another exemplary embodiment, the cargo organization and retention net system also includes a pair of slidable tracks, mounted one at each of the left and right sides of the underside of the interior cargo tray area, and whereby the interior cargo tray area is outwardly extensible, sliding along the slidable tracks. The cargo organization and retention net system also includes a pair of track pivot points, the track pivot points being mounted at the rear of the interior cargo tray area and on the underneath side, whereby the cargo organization and retention net system is liftable upwardly and pivotable about the pair of track pivot points. The cargo organization and retention net system also includes a pair of track latches, the pair of track latches being mounted at the forward section of the interior cargo tray area and on the underneath side, the track latches securely holding the slidable track in place, and whereby the cargo organization and retention net system remains stationary and securely in place.

In yet another exemplary embodiment, the cargo organization and retention net system provides that the interior cargo tray having multiple partitions further includes a plurality of place-holder grooves, the grooves providing support for the separator flap when it is located in a raised position.

In yet another exemplary embodiment, the cargo organization and retention net system provides that when the rear cargo area top lid and the separator flap are located in a closed, downward position, the cargo retention net frame and cargo retention net are located above the closed rear cargo area top lid and the closed separator flap.

In yet another exemplary embodiment, the cargo organization and retention net system provides a tension mechanism, the tension mechanism being located within the cargo retention net frame. The cargo retention net frame is disposed about the interior cargo tray, wherein the cargo retention net frame is extensible and remains in place by the tension mechanism while not being extended or retracted.

Advantageously, the cargo organization and retention net system for securely holding cargo in place overcomes many of the deficiencies known in the art pertaining to vehicle cargo systems. The technology described herein provides an easyto-use, retractable, and adjustable net frame retention system for securely holding vehicle cargo in place. The technology described herein additionally provides a cargo organization system that is washable and resists the wear and damage known in carpet panel cargo lid systems, and the like. Furthermore, the technology described herein further provides a retractable and foldable rear cargo area lid that, when in the open position for loading the cargo area, prevents items from falling behind the rear seats.

There has thus been outlined, rather broadly, the features of the technology described herein in order that the detailed description that follows may be better understood, and in order that the present contribution to the art may be better appreciated. There are additional features of the technology described herein that will be described and which will form the subject matter of the claims. In this respect, before explaining at least one embodiment of the technology described herein in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the technology described herein.

Additional aspects and advantages of the technology described herein will be apparent from the following detailed description of an exemplary embodiment which is illustrated in the accompanying drawings.

BRIEF DESCRIPTION OF THE DRAWINGS

The technology described herein is illustrated and described with reference to the various drawings, in which like reference numbers denote like method steps and/or system components, respectively, and in which:

FIG. 14 is a perspective view of a rear cargo floor organizer, illustrating the retention net frame in a raised position, pivoted about the retention net system pivot points, and shown located stationary in position as a result of the tension-locked retention net frame.

DETAILED DESCRIPTION OF THE INVENTION

Before describing the disclosed embodiments of the technology described herein in detail, it is to be understood that the technology is not limited in its application to the details of the particular arrangement shown here since the technology is capable of other embodiments. Also, the terminology used herein is for the purpose of description and not of limitation.

Figure 1:
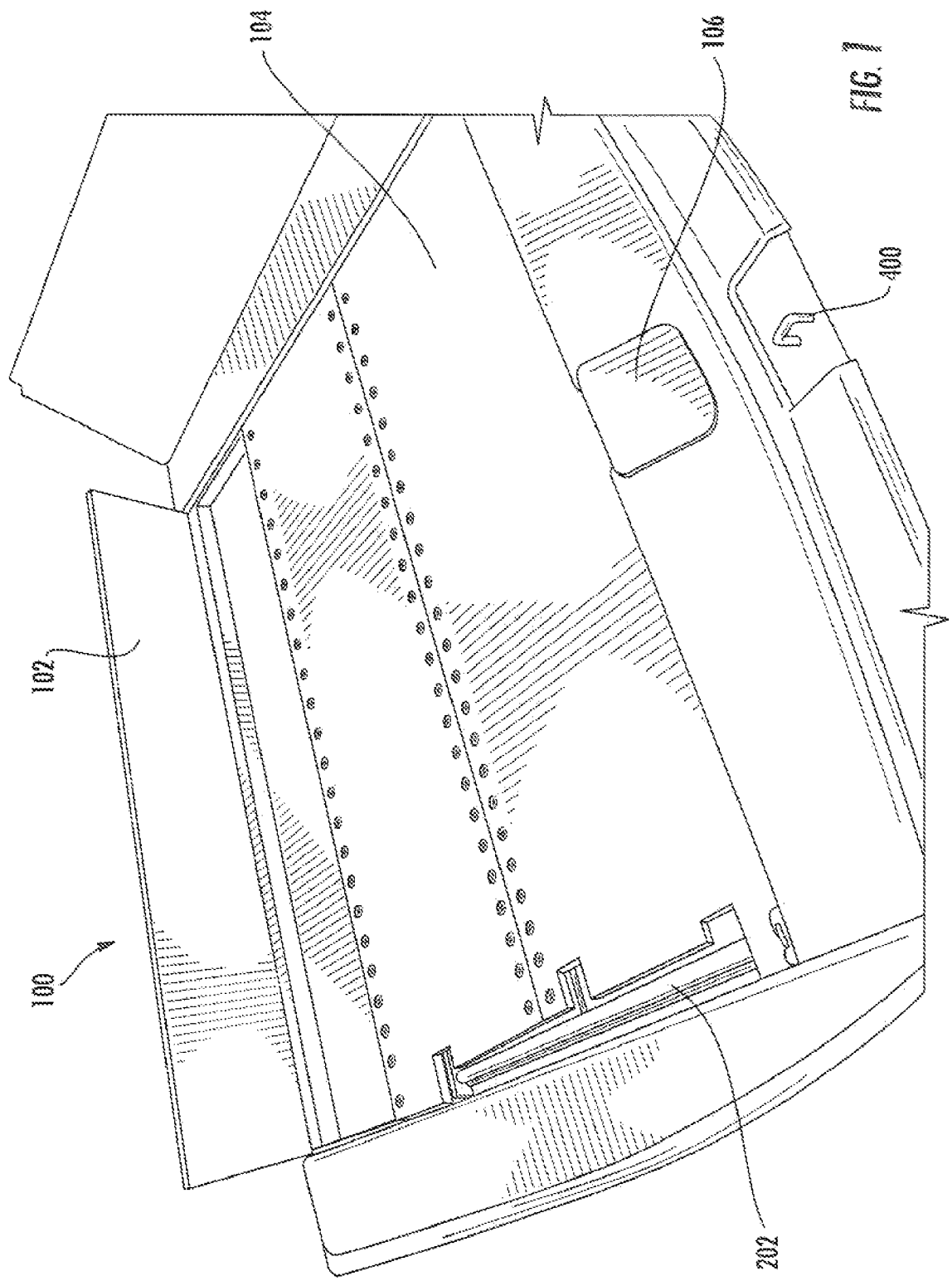
FIG. 1 is a perspective view of a rear cargo floor organizer according to an embodiment of the invention, illustrating, in particular, the latch release, the top lid, and the separator flap.
Figure 6:
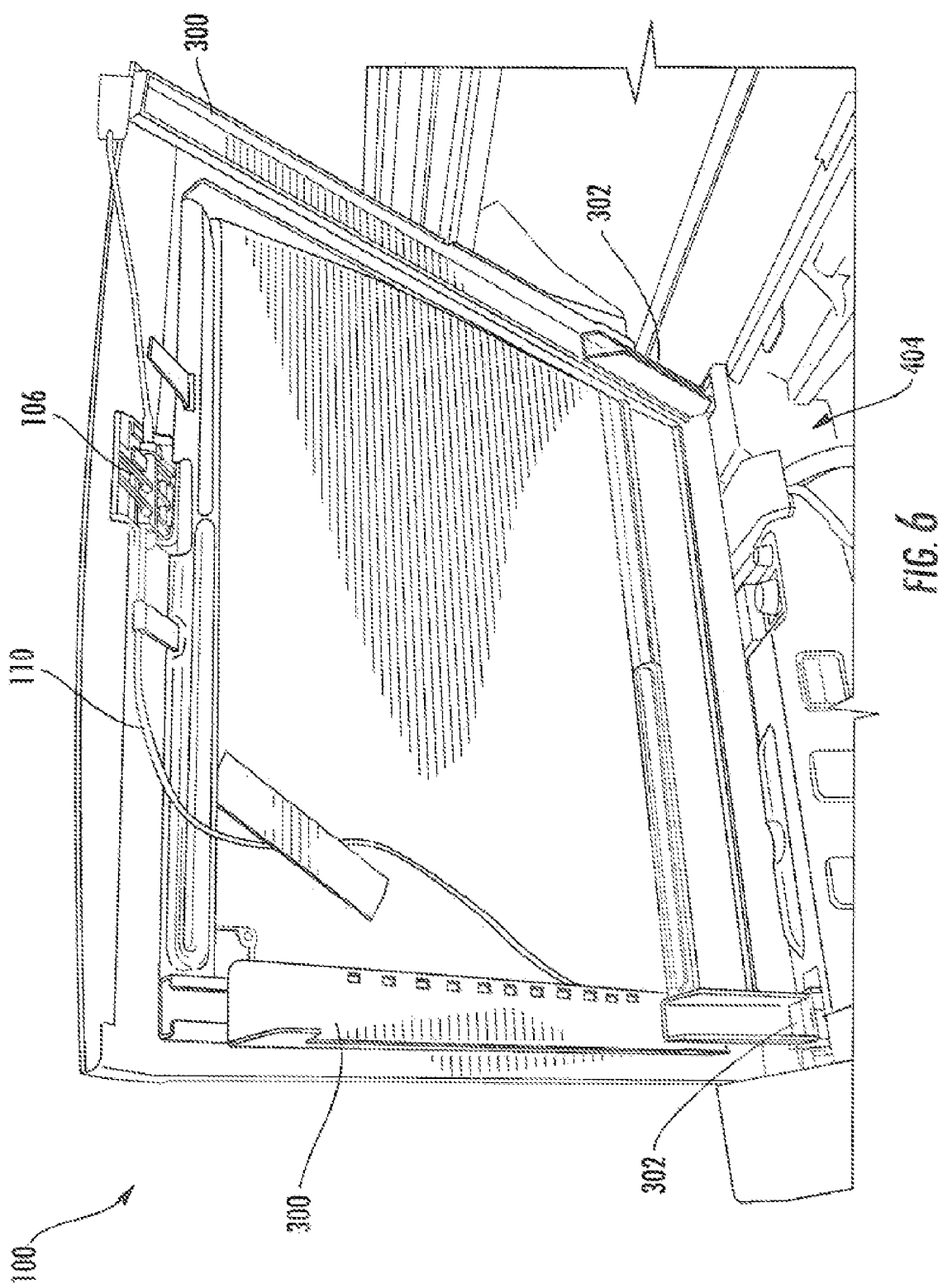
FIG. 6 is a perspective view of a rear cargo floor organizer according to an embodiment of the invention, showing the rear cargo floor organizer in an unlatched and raised position, and further illustrating, in particular, the slidable tracks, track pivots, latch release cable, and the rear floor cargo area available upon opening the rear cargo floor organizer.
Figure 10:
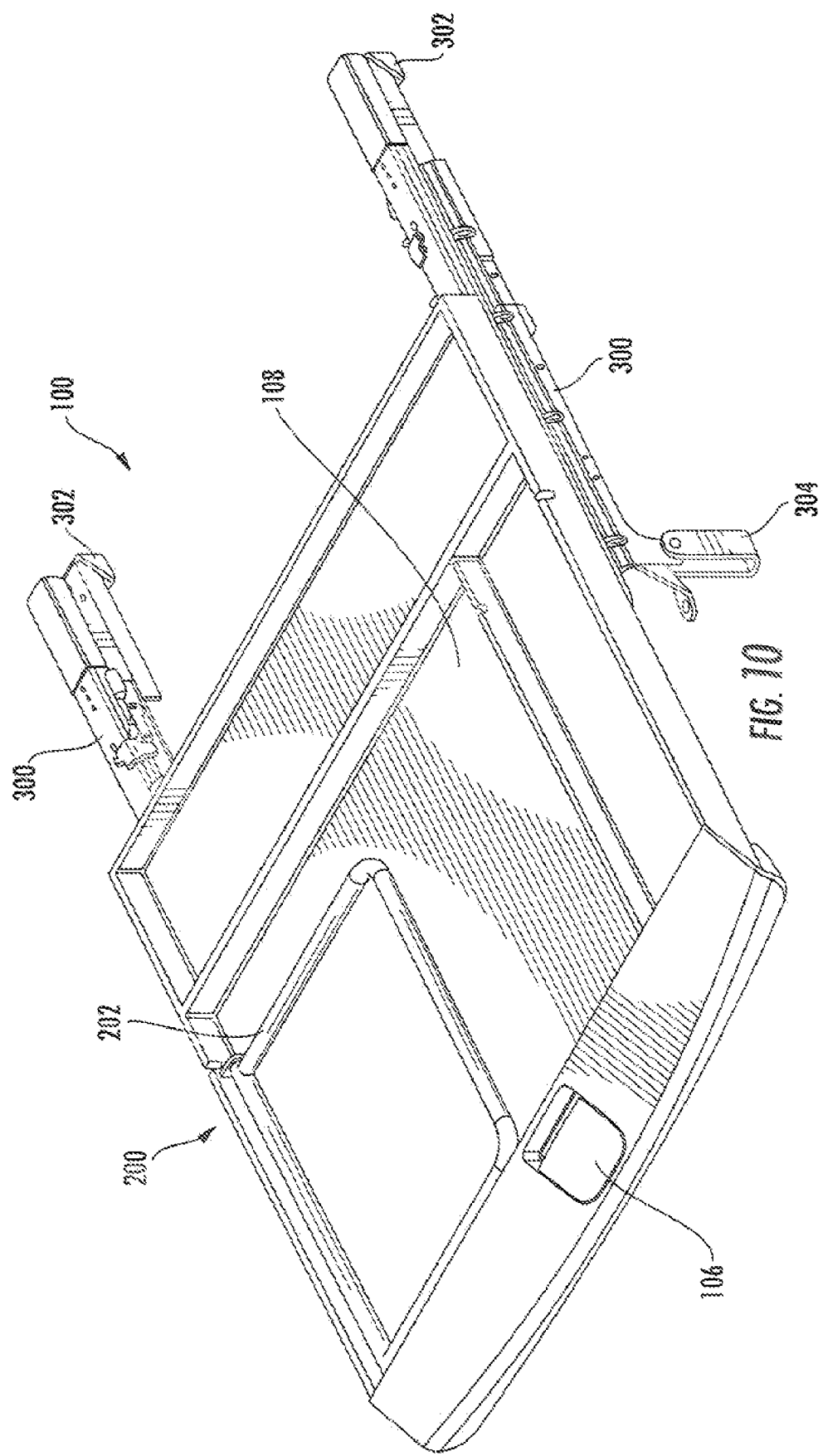
FIG. 10 is the perspective view of the rear cargo floor organizer of FIG. 8, further illustrating the rear cargo floor organizer, and in particular the interior cargo tray area, in a forward position, outwardly extended, after being pulled out along the slidable tracks.

Referring now to FIG. 1, a rear cargo floor organizer 100 is shown. The rear cargo floor organizer 100 is shown with a top lid 102 and a separator flap 104, each having a substantially rectangular shape. The top lid 102 and the separator flap 104 are hingedly connected to the rear portion of the rear cargo floor organizer 100 and are both retractable. The top lid 102 is shown open, flipped up in a backward direction. The separator flap 104, which is foldable for purposes of retraction, is shown in a closed position. In an open position, the top lid 102 prevents cargo items from falling behind the vehicle passenger rear seats (not shown) when sliding the rear cargo floor organizer 100 out for access. Additionally, the rear cargo floor organizer 100 includes a latch release 106. The latch release 106 enables a user to selectively grasp and lift (as shown in FIG. 6) or grasp and pull out (as shown in FIG. 10) the rear cargo floor organizer 100. The rear cargo floor organizer 100 is located just inside the back door or liftgate of a vehicle. The liftgate, for example, is located in an open position (not shown) and is thus disconnected from the liftgate latch 400. A portion of the retention net frame 202 is visible in FIG. 1. The remainder of the retention net frame 202 is located under the separator flap 104. Optionally, in an alternative embodiment, the retention net frame 202 is fully covered by the separator flap 104. The top lid 102 and the separator flap 104 both provide ease of use in vehicle cargo storage. Additionally, unlike traditional vehicle carpet floor systems, both the top lid 102 and the separator flap 104 are easily cleaned and washed since they are manufactured of washable materials.

Figure 2:
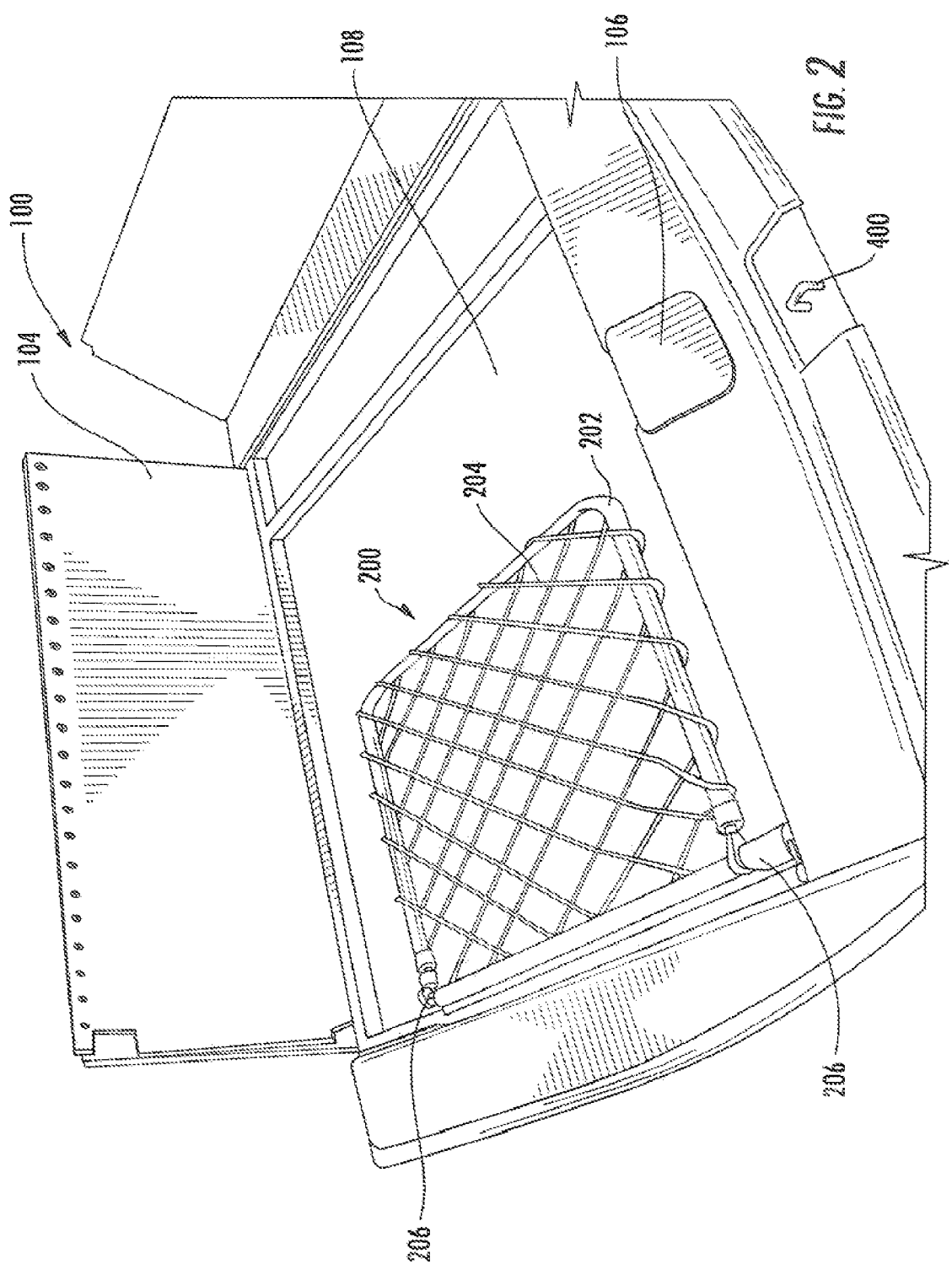
FIG. 2 is a perspective view of the rear cargo floor organizer of FIG. 1, shown with the top lid and separator flap, both in a retracted position, illustrating, in particular, the interior rear cargo tray area, the retention net system, including a retention net frame, retention net, and retention net frame pivot points, and showing the retention net frame in an unextended position.

Referring now to FIG. 2, the rear cargo floor organizer 100 of FIG. 1 is shown with the top lid 102 (not shown, located behind the separator flap 104) and the separator flap 104, both in a retracted position, thus exposing and illustrating the retention net system 200 and the interior cargo tray 108, recessed and available with various partitions. The separator flap 104 includes a horizontal fold, such that as it is retracted, it also folds essentially in half. The cargo retention net system 200 includes a cargo retention net frame 202 and a cargo retention net 204. The cargo retention net frame 202 is hingedly secured to the rear cargo floor organizer 100 and the cargo retention net 204 is securely attached to the cargo retention net frame 202. The cargo retention net frame 202 is lifted upward, pivoting about the pivot points 206. In one embodiment, the cargo retention net 204 is extended and placed over cargo items to securely hold them in place between the retention net 204 and the interior cargo tray 108. The cargo retention net system 200 includes the cargo retention net frame 202 in an unextended position and unraised in relation to the pivot points 206. A latch release 106 is available for a user to selectively lift or pull out the rear cargo floor organizer 100. The liftgate is located in an open position (not shown) and is thus disconnected from the liftgate latch 400.

Figure 3:
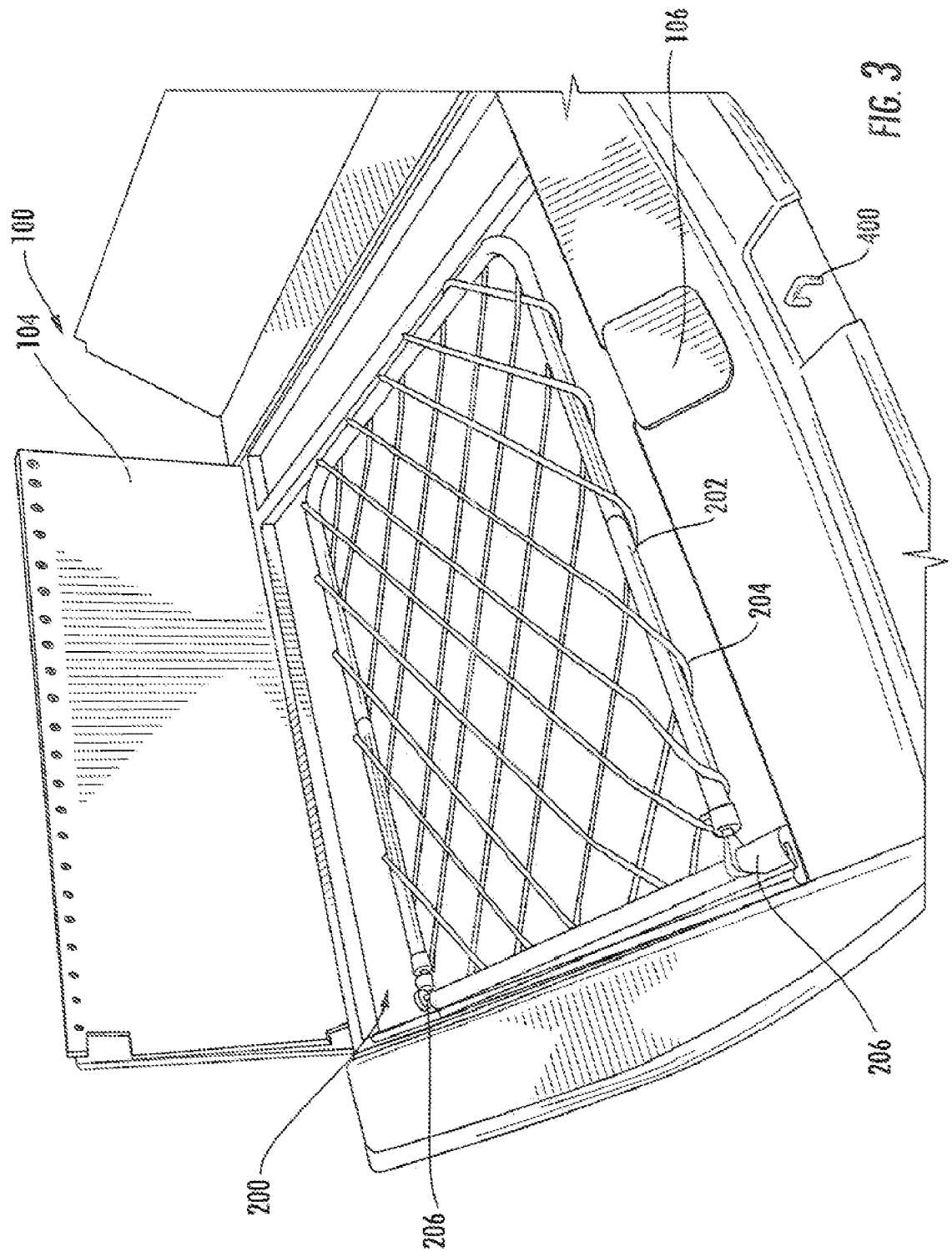
FIG. 3 is a perspective view of the rear cargo floor organizer of FIGS. 1 and 2, shown with the top lid and separator flap both in a retracted position, illustrating, in particular, the retention net system, including a retention net frame, retention net, and retention net frame pivot points, and showing the retention net frame in an extended, telescoped position.

Referring now to FIG. 3, the rear cargo floor organizer 100 is illustrated with the retention net system 200 in an extended position, extended outwardly from the pivot points 206. The cargo retention net frame 202 is illustrated in an extended position, highlighting the telescopic capabilities of the frame. The cargo retention net 204 is wrapped securely about the cargo retention net frame 202. The cargo retention net 204 also is shown in an expanded, stretched state, having moved with the cargo retention net frame 202 as it was extended. The cargo retention net system 200 is extended by pulling the retention net frame 202 in the direction away from the retention net frame pivot points 206. The cargo retention net frame 202, for example, is either raised in an upward direction, pivoted about the pivot points 206, before being extended and placed over cargo, or it is extended while stowed in the rear cargo floor organizer 100. The top lid 102 (not shown, located behind the separator flap 104) and the separator flap 104 are both located in a retracted position. A latch release 106 is available for a user to selectively lift or pull out the rear cargo floor organizer 100. The liftgate is located in an open position (not shown) and is thus disconnected from the lift gate latch 400.

Figure 4:
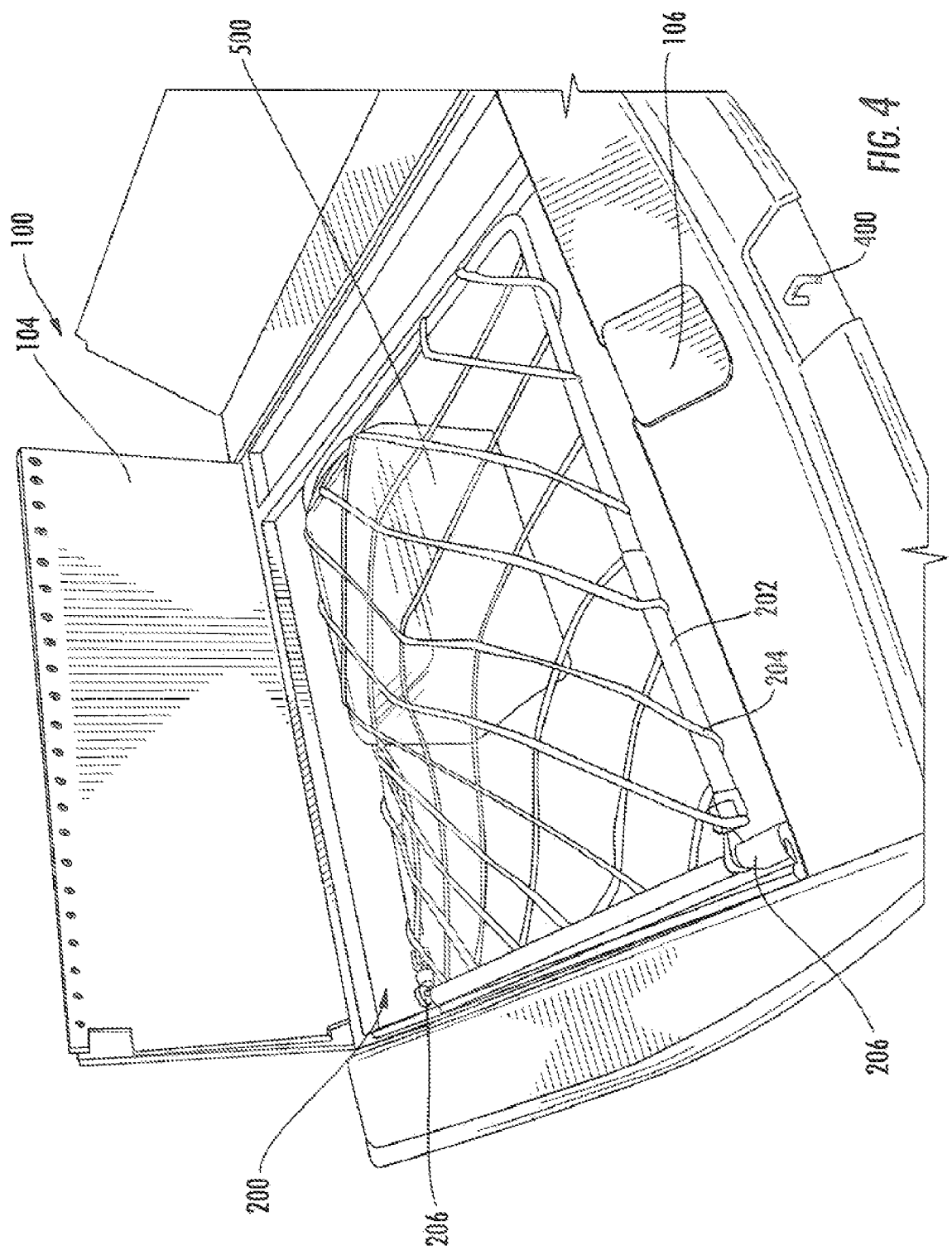
FIG. 4 is a perspective view of a rear cargo floor organizer according to an embodiment of the invention, illustrating, in particular, stowed cargo securely retained underneath the retention net system, and further illustrating the secure retention of the cargo in place under the retention net and the tension-locked retention net frame.

Referring now to FIG. 4, the rear cargo floor organizer 100 is shown with the cargo retention net system 200 in an extended position securing stowed cargo 500. The cargo retention net frame 202 is illustrated in an extended position, highlighting the telescopic capabilities of the frame. The cargo retention net 204 also is shown in an expanded, stretched state, having moved with the cargo retention net frame 202 as it was extended. The cargo retention net system 200 is extended by pulling the cargo retention net frame 202 in the direction away from the cargo retention net frame pivot points 206. The cargo retention net frame 202, for example, is either grasped-and-raised in an upward direction, pivoted about the pivot points 206, before being extended and placed over cargo 500, or it is grasped-and-extended while stowed in the rear cargo floor organizer 100. The cargo retention net frame 202 remains stationary in place either in a downward position, securely holding stowed cargo 500, or in a raised, ready-to-load position. The cargo retention net frame 202 is held in place by the ratchet-like tension locking mechanism in the cargo retention net frame system 200 that holds the cargo retention net frame 204 in place at a desired angle to the pivot points 206. The top lid 102 (not shown, located behind the separator flap 104) and the separator flap 104 are both located in a retracted position. A latch release 106 is available for a user to selectively lift or pull out the rear cargo floor organizer 100. The liftgate is located in an open position (not shown) and is thus disconnected from the liftgate latch 400.

Figure 5:
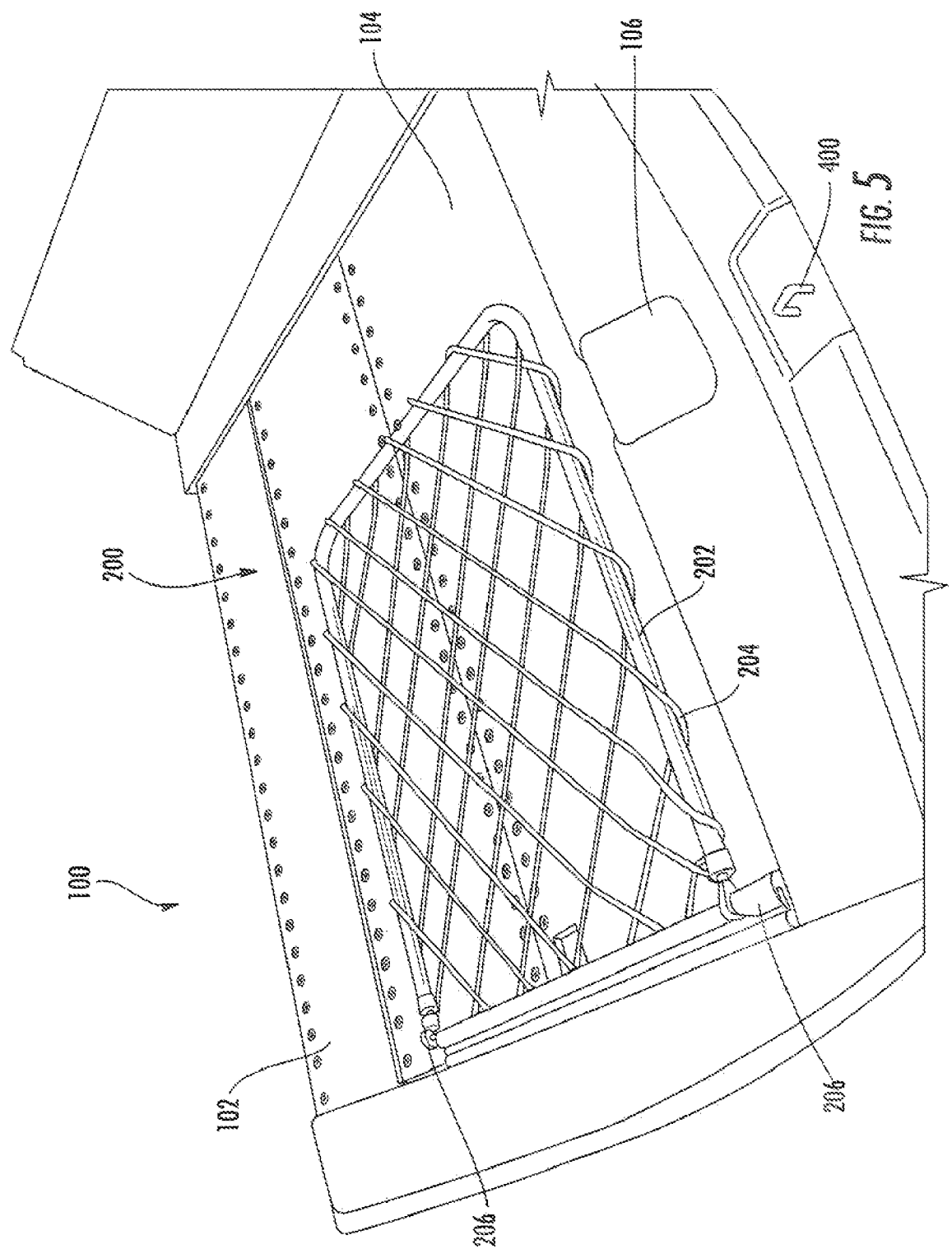
FIG. 5 is a perspective view of a rear cargo floor organizer according to an embodiment of the invention, illustrating, in particular, use of the retention net system on top of the separator flap and the top lid, both of which are located in a closed position.

Referring now to FIG. 5, the rear cargo floor organizer 100 is shown with the cargo retention net system 200 located in a position on top of the separator flap 104. The top lid 102 and the separator flap 104 are hingedly connected to the rear portion of the rear cargo floor organizer 100 and are both retractable. The top lid 102 and the separator flap 104 both are located in a closed, downward position. The cargo retention net frame 202 and the cargo retention net 204 both are illustrated in a partially extended position, neither fully extended nor fully retracted, again highlighting the telescopic capabilities of the frame. The cargo retention net system 200 is extended by pulling the retention net frame 202 in the direction away from the retention net frame pivot points 206. The cargo retention net system 200 is retracted by pushing the cargo retention net frame 202 in the direction toward the cargo retention net frame pivot points 206. While used in this manner, the rear cargo floor organizer 100 provides secure storage above the top lid 102 and the separator flap under the cargo retention net 204, below the top lid 102 and the separator flap 104 in the interior cargo tray area 108 (not shown, but as illustrated previously in FIG. 2), and below the entire rear cargo floor organizer 100 once it has been selectively grasped and lifted up by a user grasping latch release 106 and lifting. The rear floor cargo area 404 storage area located underneath the entire rear cargo floor organizer 100 is illustrated in FIG. 6. The liftgate is located in an open position (not shown) and is thus disconnected from the lift gate latch 400.

Referring now to FIG. 6, the rear cargo floor organizer 100 is shown in an unlatched and raised position, exposing the rear floor cargo area 404. Items are stowed in the rear floor cargo area 404. The rear cargo floor organizer 100 is shown as it is located once it has been selectively grasped and lifted up by a user grasping latch release 106 and lifting. The underside mechanisms of the release latch 106 are shown. Once the latch release 106 is grasped by a user, the latch release cable 110 disengages any locks, levers, or the like holding the rear cargo floor organizer 100 in place in its closed position. The rear cargo floor organizer 100, in this raised position, is shown with the track pivots 302, about which the rear cargo floor organizer 100 is lifted and retracted. The track pivots 302 are hingedly connected to the back rear corners of the rear cargo floor organizer 100 and enable the opening of the rear cargo floor organizer 100. The rear cargo floor organizer 100 also is illustrated with a slidable track 300 on each side. A slidable track 300 is mounted on each of the left and right sides of the underside of the rear cargo floor organizer 100. When not used for sliding the rear cargo floor organizer 100 out toward the user (as shown in FIG. 10), the slidable tracks 300 provide structural support to the rear cargo floor organizer 100.

Figure 7:
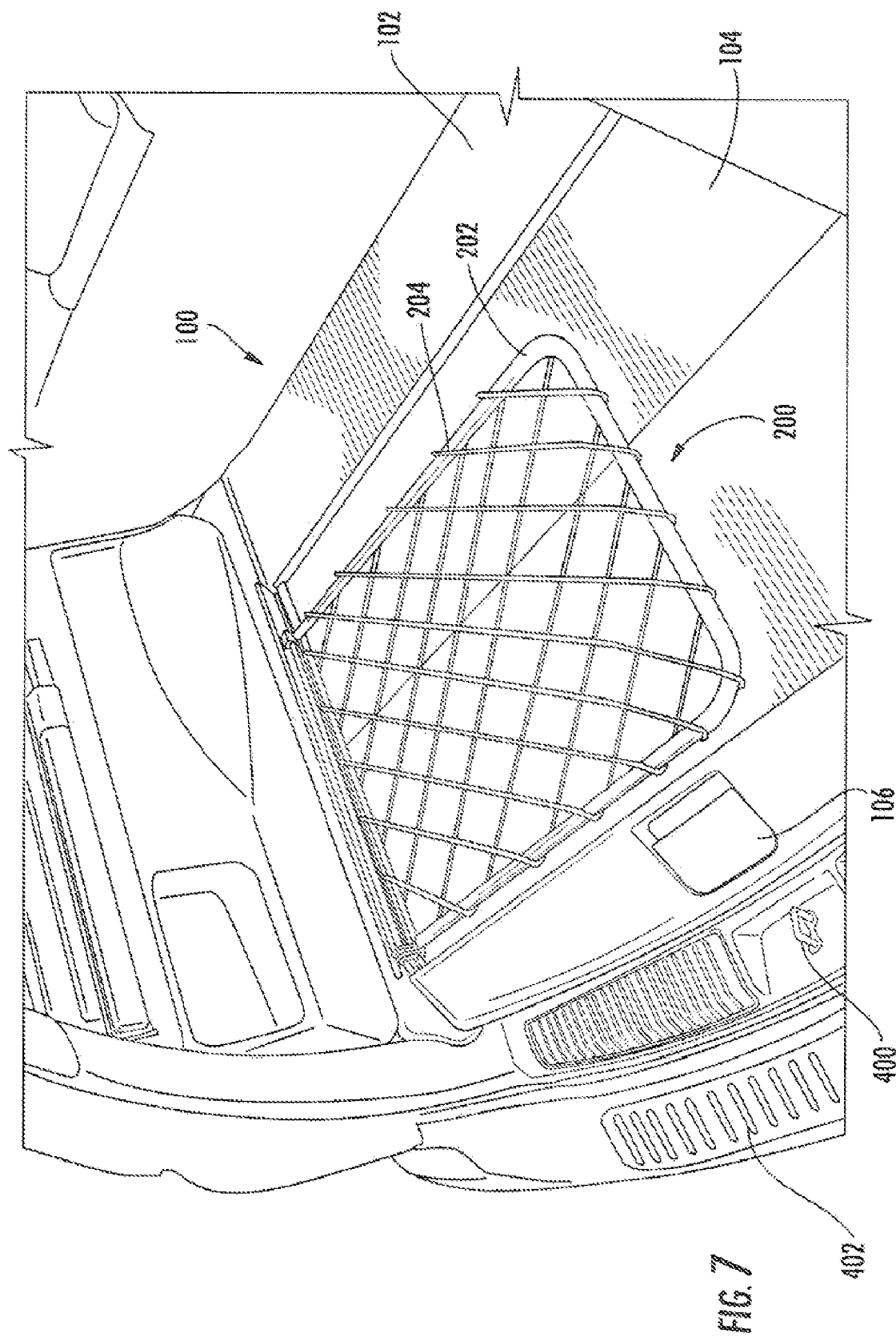
FIG. 7 is a perspective view of a rear cargo floor organizer shown in the rear cargo area of a vehicle and illustrating the use of the retention net system on top of the closed separator flap and top lid.

Referring now to FIG. 7, the rear cargo floor organizer 100 is shown in the rear cargo area of a vehicle, illustrating, in particular, the use of the cargo retention net system 200 on top of the closed separator flap 104 and top lid 102. The top lid 102 and the separator flap both are located in a closed, downward position. The cargo retention net frame 202 and the cargo retention net 204 both are illustrated in a partially extended position, neither fully extended nor fully retracted, highlighting the telescopic capabilities of the frame. The liftgate is located in an open position (not shown) and is thus disconnected from the liftgate latch 400 just inside the vehicle from the rear bumper 402 of the vehicle.

Figure 8:
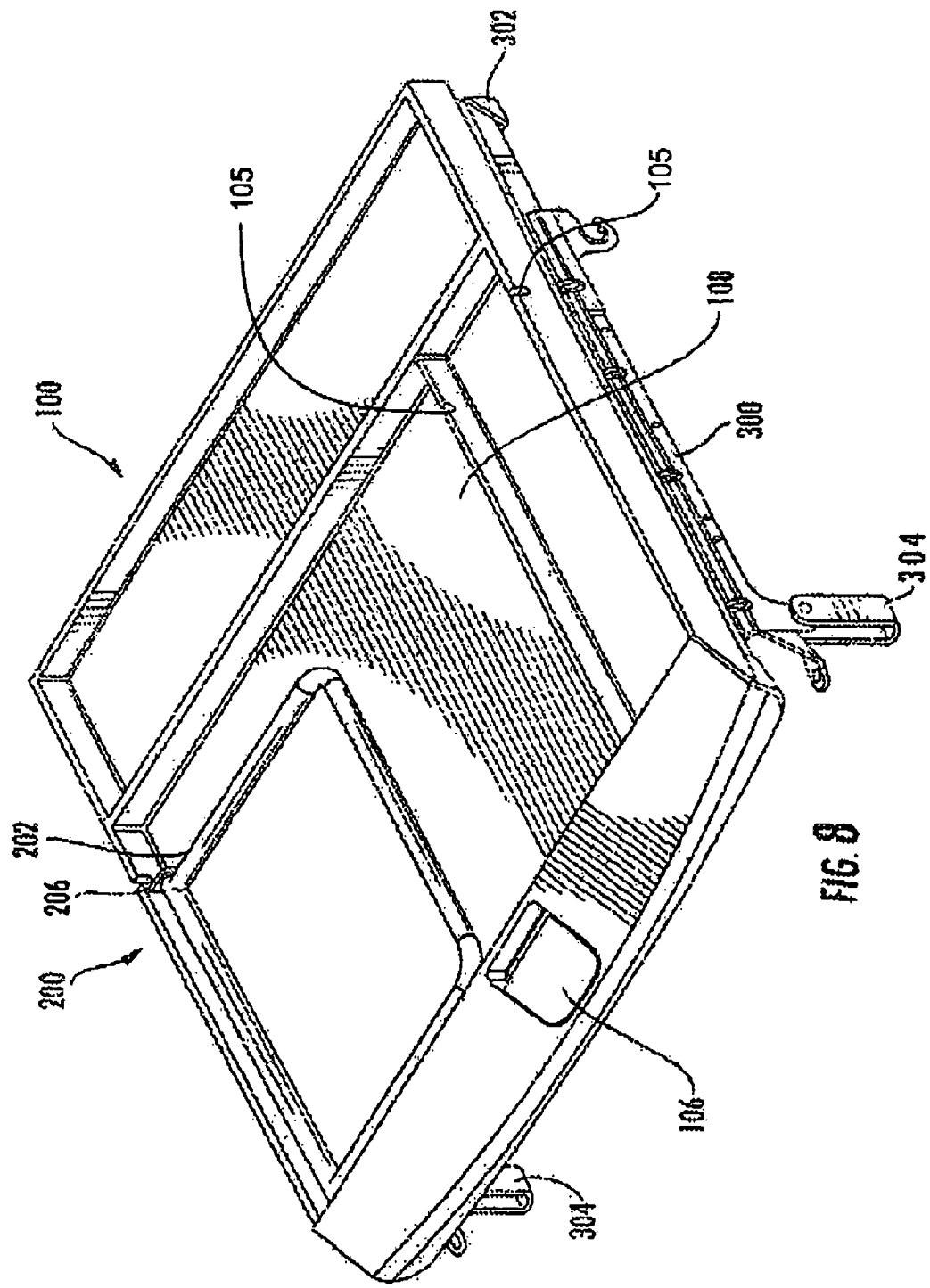
FIG. 8 is a perspective view of a rear cargo floor organizer shown with the retention net, top lid, and separator flap all removed to illustrate, in particular, the interior cargo tray area and its multiple partitions and storage areas.

Referring now to FIG. 8, the rear cargo floor organizer 100 is shown with the cargo retention net, top lid, and separator flap all removed (204, 102, 104, respectively, in FIG. 7) to illustrate, in particular, the interior cargo tray area 108. The interior cargo tray area 108 is recessed and includes multiple partitions to further support and retain cargo items and preventing unwanted shifting of cargo items during transit or otherwise. When the rear cargo floor organizer 100 is used with the top lid 102 and separator flap 104 in a retracted position, larger cargo items may be stored on the interior cargo tray area 108. The interior cargo tray area 108 is an easy-to-use, washable compartment that is covered by the top lid 102 and separator flap 104 when not in use. The cargo retention net system 200 is shown with its cargo retention net frame 202 in an unextended position. The cargo retention net frame 202 is lifted upward, pivoting about the pivot points 206. The rear cargo floor organizer 100 includes a slidable track 300 on the left and right undersides. The slidable track 300 is connected to a track pivot 302, about which the rear cargo floor organizer 100 is lifted upward at an angle to the track pivot 302. A latch release 106 is available for a user to selectively lift or pull out the rear cargo floor organizer 100. When not lifted upward the rear cargo floor organizer 100 is held firmly in place by the track latches 304 in which the slidable track is detachably mounted.

Figure 9:
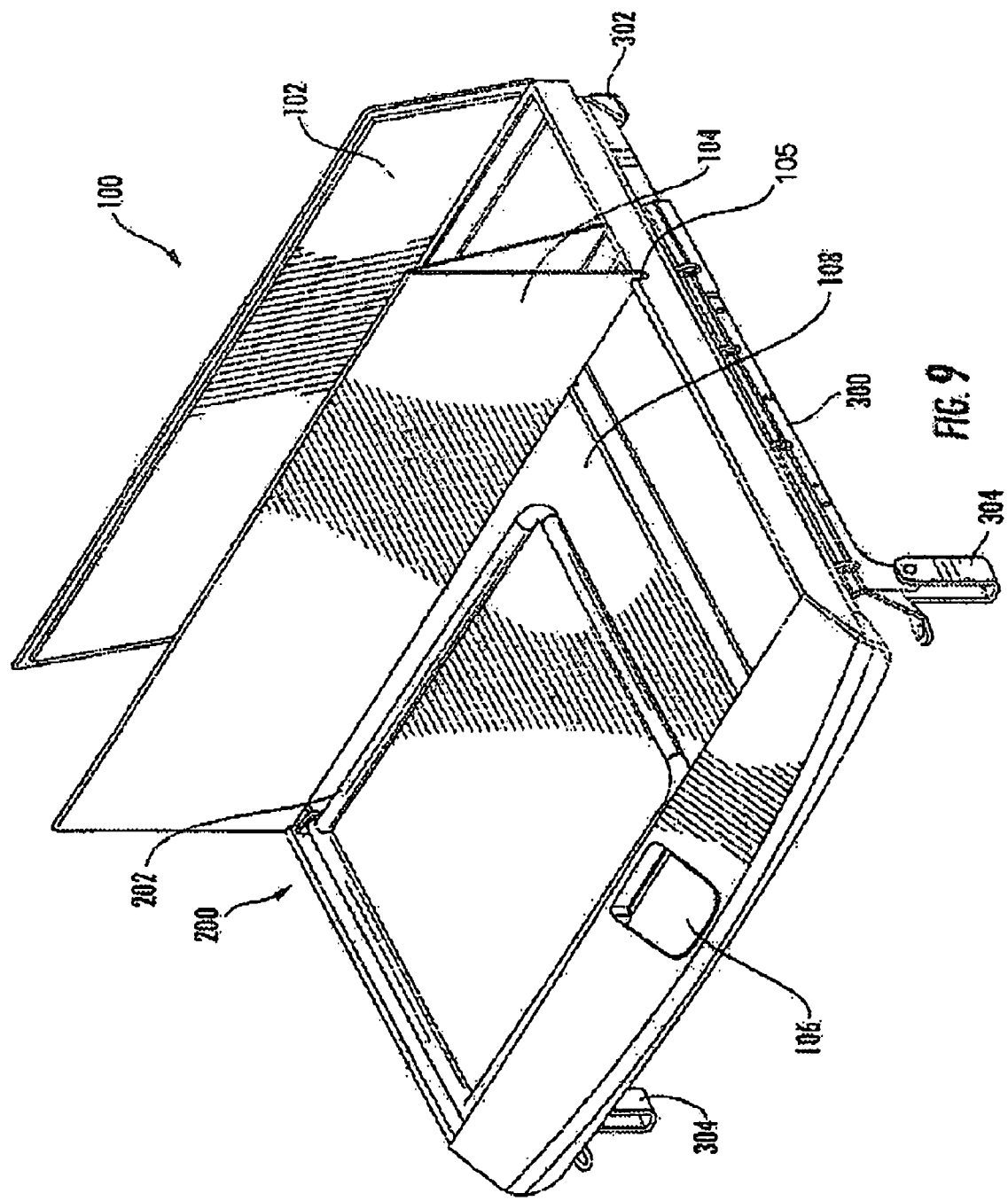
FIG. 9 is a perspective view of a rear cargo floor organizer according to an embodiment of the invention, illustrating, in particular, the latch release, top lid in a raised position, separator flap in a raised position, slidable tracks, track pivots, and track latches.

Referring now to FIG. 9, the rear cargo floor organizer 100 is shown with the top lid 102 and the separator flap 104 retracted. The separator flap 104 is also shown in a folded position. The separator flap 104 uses grooves 105 located with the interior cargo bay area 108 to hold the separator flap 104, once it has been folded, in placed while loading cargo items. The rear cargo floor organizer 100 is illustrated with the cargo retention net system 200. The cargo retention net frame 202 is illustrated in an extended position, highlighting the telescopic capabilities of the frame. A latch release 106 is available for a user to selectively lift or pull out the rear cargo floor organizer 100. The rear cargo floor organizer 100 includes a slidable track 300 on the left and right undersides of the interior cargo tray area 108. The slidable track 300 is mounted to a track pivot 302, about which the rear cargo floor organizer 100 is lifted upward at an angle to the track pivot 302. When not filled upward, the rear cargo floor organizer 100 is held firmly in place by the track latches 304 in which the slidable track is detachably mounted.

Referring now to FIG. 10, the rear cargo floor organizer 100 is shown with the interior cargo tray area 108, in a forward position, outwardly extended, after being pulled out, by a user, along the slidable tracks 300. A user grasps the latch release 106 and selectively lifts upward or pulls outward the interior cargo tray area 108. As illustrated here, a user has grasped the latch release 106 and pulled the interior cargo tray area 108 outward. The slidable track 300 is connected to a track pivot 302, about which the rear cargo floor organizer 100 is lifted upward at an angle to the track pivot 302. When not lifted upward the rear cargo floor organizer 100 is held firmly in place by the track latches 304 in which the slidable track is detachably mounted. The retention net system 200 is shown with its retention net frame 202 in an unextended position.

Figure 11:
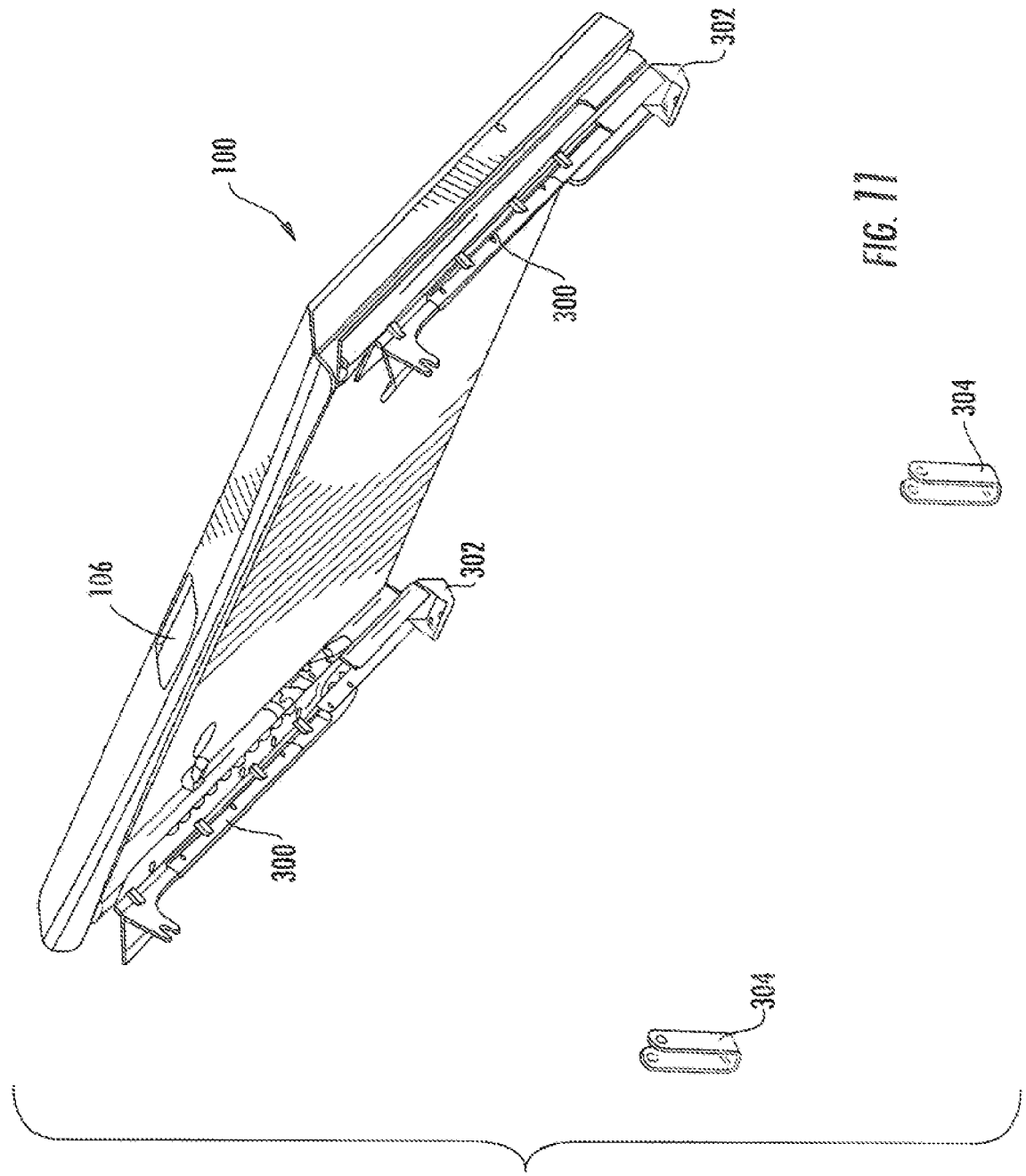
FIG. 11 is a perspective view of the rear cargo floor organizer in an unlatched and raised position, further illustrating the disengagement and detachment of the slidable tracks from the track latches and pivot of the rear cargo floor organizer about the hack pivots.

Referring now to FIG. 11, the rear cargo floor organizer 100 is shown in a lifted, upright position. A user grasps the latch release 106 and selectively lifts upward or pulls outward the interior cargo tray area 108. As illustrated here, a user has grasped the latch release 106 and lifted the rear cargo floor organizer 100 upwardly, thus making available the rear floor cargo area 404 (as shown in FIG. 6). The slidable track 300 is connected to a track pivot 302, about which the rear cargo floor organizer 100 is detached from the track latches 304 and lifted upward at an angle to the track pivot 302. The track latches 304 are mounted to the vehicle floor to securely hold the rear cargo floor organizer 100 in place when in a closed position. When not lifted upward, the rear cargo floor organizer 100 is held firmly in place by the track latches 304 in which the slidable track is detachably mounted.

Figure 12:
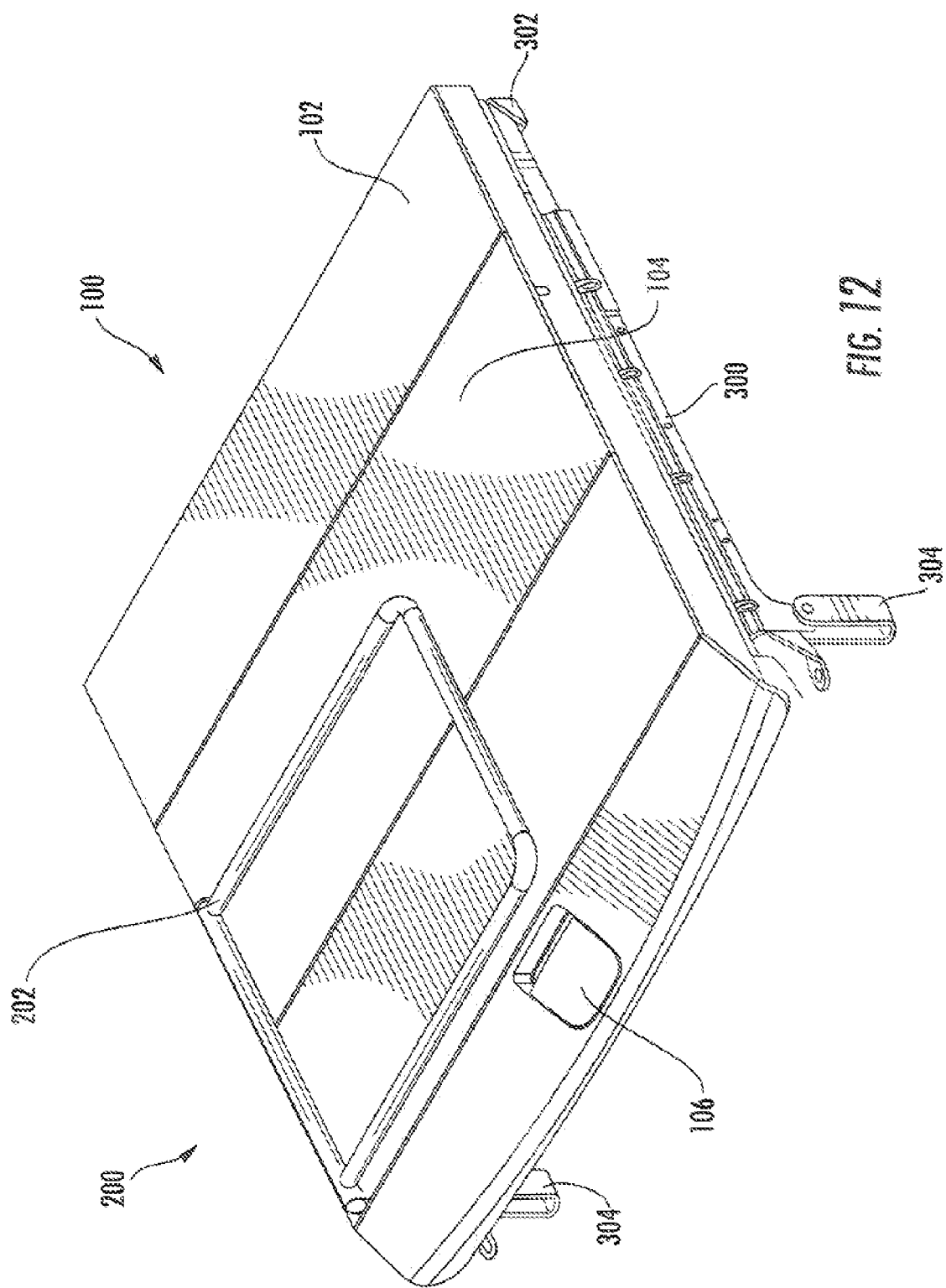
FIG. 12 is a perspective view of a rear cargo floor organizer, illustrating, in particular, use of the retention net frame on top of the separator flap and top lid, both of which are located in a closed position.

Referring now to FIG. 12, the rear cargo floor organizer 100 is shown with the cargo retention net system 200 and the cargo retention net frame 202 on top of the separator flap 104 and top lid 102, both of which are located in a closed position. The top lid 102 and the separator flap both are located in a closed, downward position. The cargo retention net frame 202 is illustrated in a partially extended position. While used in this manner, the rear cargo floor organizer 100 provides secure storage above the top lid 102 and the separator flap 104. The slidable track 300 is connected to a track pivot 302, about which the rear cargo floor organizer 100 is lifted upward at an angle to the track pivot 302. When not lifted upward the rear cargo floor organizer 100 is held firmly in place by the track latches 304 in which the slidable track is detachably mounted. The rear cargo floor organizer 100 may be lifted even while the retention net system 200 is located on top of the separator flap 104 and top lid 102. A latch release 106 is available for a user to selectively lift or pull out the rear cargo floor organizer 100.

Figure 13:
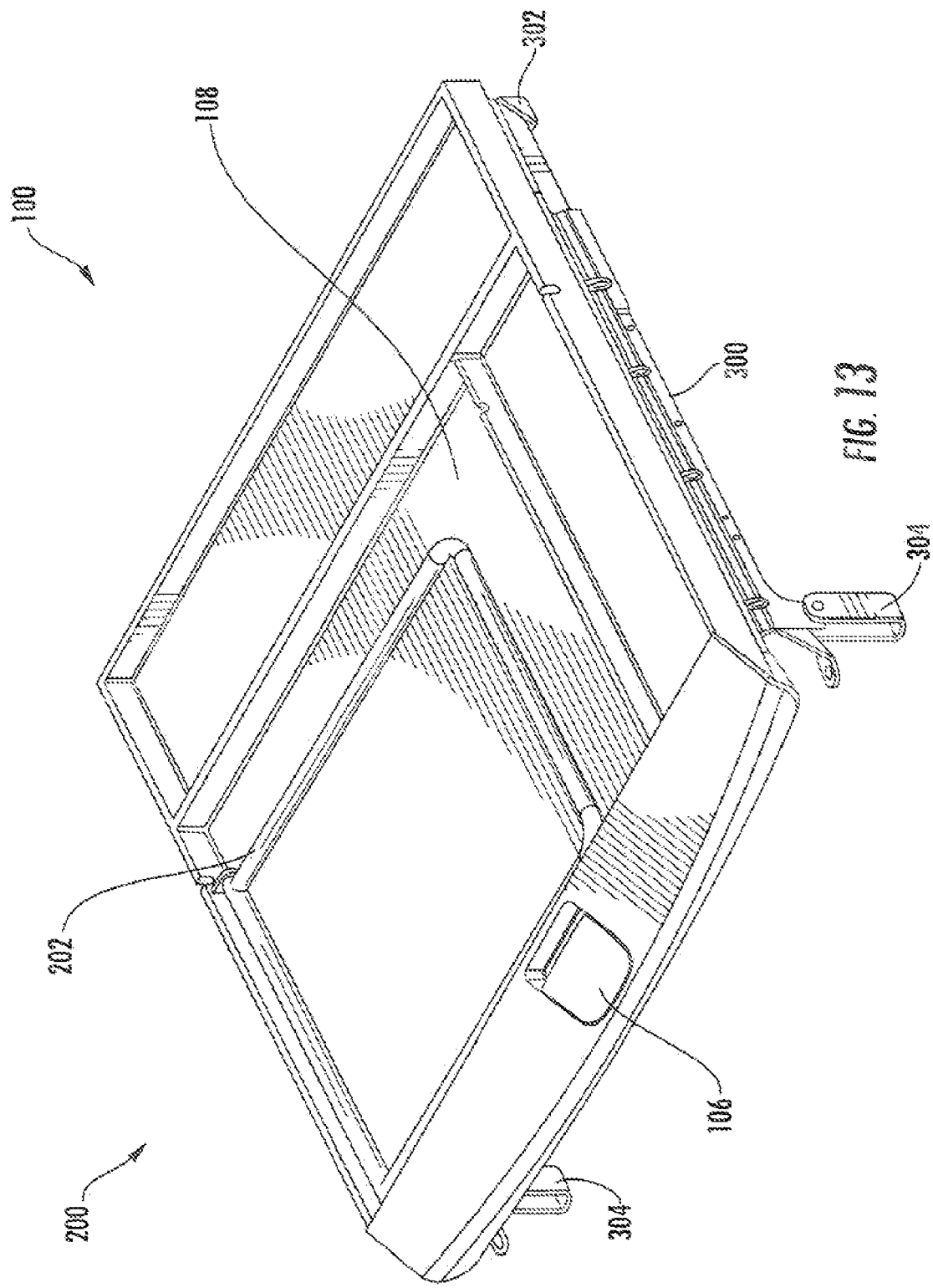
FIG. 13 is a perspective view of the rear cargo floor organizer with the retention net, top lid, and separator flap all removed, further illustrating the retention net frame in an extended, telescoped position and the interior cargo tray area with its multiple partitions and multiple storage areas.

Referring now to FIG. 13, the rear cargo floor organizer 100 is shown with the interior cargo tray area 108. A user grasps the latch release 106 and selectively lifts upward or pulls outward the interior cargo tray area 108. The slidable track 300 is connected to a track pivot 302, about which the rear cargo floor organizer 100 is lifted upward at an angle to the track pivot 302. When not lifted upward the rear cargo floor organizer 100 is held firmly in place by the track latches 304 in which the slidable track is detachably mounted. The retention net system 200 is shown with its retention net frame 202 in a partially extended position.

Referring now to FIG. 14, the rear cargo floor organizer 100 is shown with the interior cargo tray area 108 and cargo retention net system 200. A user grasps the latch release 106 and selectively lifts upward or pulls outward the interior cargo tray area 108. The slidable track 300 is connected to a track pivot 302, about which the rear cargo floor organizer 100 is lifted upward at an angle to the track pivot 302. When not lifted upward the rear cargo floor organizer 100 is held firmly in place by the track latches 304 in which the slidable track is detachably mounted. The cargo retention net system 200 is shown with its retention net frame 202 in an unextended, yet upright, position. The cargo retention net frame 202 is lifted upward, pivoting about the pivot points 206. The cargo retention net system 200 is extended by pulling the retention net frame 202 in the direction away from the retention net frame pivot points 206. The cargo retention net system is retracted by pushing the retention net frame 202 in the direction toward the retention net frame pivot points 206. The cargo retention net frame 202 is held in place by the ratchet-like tension locking mechanism in the cargo retention net frame system 200 that holds the cargo retention net frame 204 in place at a desired angle to the pivot points 206.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A cargo organization and retention net system for securely holding cargo in place, in combination with a vehicle having a rear cargo area, the cargo organization and retention net system comprising:
   an interior cargo tray having a plurality of storage partitions;
   a cargo retention net frame attachably disposed on the interior cargo tray, wherein the cargo retention net frame is extensible and pivotable from the interior cargo tray; and
   a cargo retention net, the cargo retention net being disposed about the cargo retention net frame, and wherein the cargo retention net is extensible from the cargo retention net frame and extends as the cargo retention net frame extends.

2. The cargo organization and retention net system of claim 1, further comprising:
   a rear cargo area cop lid, wherein the rear cargo area top lid is hingedly attached to the cargo organization and retention net system and the rear cargo area top lid is retractable;
   a separator flap, wherein the separator flap is hingedly attached to the cargo organization and retention net system and the separator flap is both retractable and foldable; and
   wherein when the rear cargo area top lid and the separator flap are retracted, the interior cargo tray having multiple partitions is accessible.

3. The cargo organization and retention net system of claim 1, further comprising:
   a plurality of retention net frame pivot points, hingedly connected to the interior cargo tray, about which the retention net frame pivots enabling the retention net frame to be raised or lowered as desired to hold a cargo item securely in place.

4. The cargo organization and retention net system of claim 3,
   wherein the retention net frame pivot points are selectively holdable in one of a plurality of positions including a closed position; and
   wherein the cargo retention net frame and the cargo retention net are held in place while pivoted, and while in a closed position, by the retention net frame pivot points.

5. The cargo organization and retention net system of claim 1, further comprising:
   a release latch, whereby the cargo organization and retention net system is grasped by a user and either is lifted upward or pulled outward; and
   wherein, when the cargo organization and retention net system is lifted upward, a rear cargo storage area is made available; and
   wherein, when the cargo organization and retention net system is pulled outward, the interior cargo tray area is made more accessible to a user.

6. The cargo organization and retention net system of claim 1, further comprising:
   a pair of slidable tracks, mounted one at each of the left and right sides of an underside of the interior cargo tray area, and whereby the interior cargo tray area is outwardly extensible, sliding along the slidable tracks.

7. The cargo organization and retention net system of claim 6, further comprising:
   a pair of track pivot points, the track pivot points being mounted at a rear of the interior cargo tray area and on the underside thereat whereby the cargo organization and retention net system is liftable upwardly and pivotable about the pair of track pivot points.

8. The cargo organization and retention net system of claim 6, further comprising:
   a pair of track latches, the pair of track latches being mounted at a forward section of the interior cargo tray area and on the underside thereof, the track latches securely holding the slidable track in place, and whereby the cargo organization and retention net system remains stationary and securely in place.

9. The cargo organization and retention net system of claim 1, wherein the interior cargo tray having multiple partitions further comprises:
   a plurality of place-holder grooves, the grooves providing support for the separator flap when it is located in a raised position.

10. The cargo organization and retention net system of claim 2, wherein the rear cargo area top lid and the separator flap are located in a closed, downward position, and the cargo retention net frame and cargo retention net are located above the closed rear cargo area top lid and the closed separator flap.

11. The cargo organization and retention net system of claim 1, wherein the interior cargo tray having multiple partitions further comprises a plastic washable surface area.

12. A cargo organization and retention net system for holding cargo in combination with a vehicle having a rear cargo area, the cargo organization and retention net system comprising:
   an interior cargo tray;
   a cargo retention net frame disposed in operable cooperation with the interior cargo tray, wherein the cargo retention net frame is extensible and pivotable relative to the interior cargo tray; and
   a cargo retention net carried by the cargo retention net frame.

13. The cargo organization and retention net system of claim 12, further comprising:
   a rear cargo area top lid hingedly attached to the cargo organization and retention net system and configured to be retractable;
   a separator flap hingedly attached to the cargo organization and retention net system and configured to be retractable and foldable; and
   wherein, when the rear cargo area top lid and the separator flap are retracted, the interior cargo tray is accessible.

14. The cargo organization and retention net system of claim 12, further comprising a plurality of retention net frame pivots enabling the retention net frame to be raised or lowered by rotation about the retention net frame pivots.

15. The cargo organization and retention net system of claim 14 wherein the plurality of retention net frame pivots are configured to hold the cargo retention net frame and cargo retention net in place in a plurality of positions.

16. The cargo organization and retention net system of claim 12, further comprising:
   a release latch configured to enable a user to grasp the release latch and either lift upward or pull outward at least a portion of the cargo organization and retention net system; and
   wherein access is provided to a rear cargo storage area when the cargo organization and retention net system is lifted upward; and
   wherein access to the interior cargo tray area is facilitated when the cargo organization and retention net system is pulled outward.

17. The cargo organization and retention net system of claim 12, further comprising a pair of elongate tracks carrying the interior cargo tray area that enable movement of the interior cargo tray area along the tracks.

18. The cargo organization and retention net system of claim 17, further comprising a pair of track latches that securely hold the elongate cracks in place holding the cargo organization and retention net system to in place.

19. A cargo organization and retention net system for holding cargo in combination with a vehicle having a rear cargo area, the cargo organization and retention net system comprising:
   an interior cargo tray carried by a plurality of tracks enabling movement of the cargo tray along the tracks;
   a cargo retention net frame disposed in operable cooperation with the interior cargo tray, the cargo retention net frame comprised of a plurality of pivots enabling pivotable movement of the cargo retention net frame relative to the interior cargo tray; and is extensible and pivotable relative to the interior cargo tray;
   a cargo retention net carried by the cargo retention net frame; and
   a release latch configured to enable a user to grasp the release latch and either lift upward or pull outward at least a portion of the cargo organization and retention net system; and
   wherein access is provided to an rear cargo storage area when the cargo organization and retention net system is lifted upward; and
   wherein access to the interior cargo tray is facilitated when the cargo organization and retention net system is pulled outward.

20. The cargo organization and retention net system of claim 19, wherein the rear cargo storage area underlies the cargo organization and retention net system and the interior cargo tray has a plurality of storage partitions.

* * * * *